US012246805B2

(12) United States Patent
Shah et al.

(10) Patent No.: US 12,246,805 B2
(45) **Date of Patent: *Mar. 11, 2025**

(54) OFFSHORE LNG PROCESSING FACILITY

(71) Applicant: NFE PATENT HOLDINGS LLC, New York, NY (US)

(72) Inventors: Alapkumar R. Shah, Overland Park, KS (US); Shawn D. Hoffart, Miami, FL (US); Christopher Michael Windeler, Bowen Island (CA)

(73) Assignee: NFE Patent Holdings LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/369,516

(22) Filed: Sep. 18, 2023

(65) Prior Publication Data

US 2024/0002023 A1 Jan. 4, 2024

Related U.S. Application Data

(63) Continuation of application No. 18/094,322, filed on Jan. 6, 2023, now Pat. No. 11,760,446.

(Continued)

(51) Int. Cl.

*B63B 35/44* (2006.01)
*B63B 1/12* (2006.01)

(Continued)

(52) U.S. Cl.

CPC ................ *B63B 35/44* (2013.01); *B63B 1/12* (2013.01); *B63B 25/14* (2013.01); *F17C 6/00* (2013.01);

(Continued)

(58) Field of Classification Search

CPC ............ B63B 35/44; B63B 2035/4433; B63B 2035/4486; F17C 6/00

See application file for complete search history.

(56) References Cited

U.S. PATENT DOCUMENTS 3,766,583 A 10/1973 Phelps
4,202,648 A 5/1980 Kvamsdal
(Continued)

FOREIGN PATENT DOCUMENTS

AU 2012207058 A1 8/2012
AU 2012207059 B2 11/2013
(Continued)

OTHER PUBLICATIONS

YouTube Video "Fast LNG" by New Fortress Energy, uploaded May 27, 2021; https://www.youtube.com/watch?v=ta4Py2WH4kc.
(Continued)

*Primary Examiner* — S. Joseph Morano
*Assistant Examiner* — Jovon E Hayes
(74) *Attorney, Agent, or Firm* — Patterson + Sheridan, LLP

(57) ABSTRACT

An offshore LNG processing plant includes a first module including a personnel accommodation facility on a first vessel, a second module including a gas treatment facility on a second vessel, and a third module including a gas liquefaction facility on a third vessel. Each of the first, second, and third modules are assembled on the corresponding vessels, and then transported to an offshore location in a body of water, such as a river, a lake, or a sea. At the offshore location, each vessel deploys legs to the bed of the body of water to raise a hull of each vessel out of the water. The first module is then coupled to the second module, and the second module is coupled to the third module. A fourth module on a fourth vessel is coupled to the third module to provide LNG storage.

20 Claims, 5 Drawing Sheets

Related U.S. Application Data

(60) Provisional application No. 63/297,496, filed on Jan. 7, 2022.

(51) Int. Cl.

*B63B 25/14* (2006.01)
*F17C 6/00* (2006.01)
*F25J 1/00* (2006.01)

(52) U.S. Cl.

CPC ................. *B63B 2035/4433* (2013.01); *B63B 2035/4473* (2013.01); *B63B 2035/4486* (2013.01); *F17C 2221/033* (2013.01); *F17C 2227/0157* (2013.01); *F17C 2265/032* (2013.01); *F17C 2270/0121* (2013.01); *F25J 1/0022* (2013.01)

(56) References Cited

U.S. PATENT DOCUMENTS

| | | | | |
|---|---|---|---|---|
| 6,085,528 | A | 7/2000 | Woodall et al. | |
| 6,298,671 | B1 | 10/2001 | Kennelley et al. | |
| 6,546,739 | B2 | 4/2003 | Frimm et al. | |
| 6,658,891 | B2 | 12/2003 | Reijnen et al. | |
| 7,360,367 | B2 | 4/2008 | Hubbard et al. | |
| 7,461,520 | B2 | 12/2008 | Iijima et al. | |
| 8,037,694 | B2 | 10/2011 | Runbalk | |
| 8,640,493 | B1 * | 2/2014 | Shivers, III | F25J 1/005<br>114/230.17 |
| 8,683,823 | B1 * | 4/2014 | Shivers, III | F25J 1/0283<br>114/230.17 |
| 9,545,980 | B2 | 1/2017 | Morimoto | |
| 9,574,822 | B2 | 2/2017 | Haberberger et al. | |
| 10,197,220 | B2 * | 2/2019 | Faka | F25J 1/0025 |
| 10,240,862 | B2 * | 3/2019 | Faka | F25J 1/0022 |
| 10,539,361 | B2 * | 1/2020 | Byfield | F25J 1/0259 |
| 11,402,152 | B2 * | 8/2022 | Christensen | F25J 1/0072 |
| 2009/0208294 | A1 * | 8/2009 | Yao | F25J 1/0259<br>405/196 |
| 2012/0230772 | A1 * | 9/2012 | Foo | B63B 27/34<br>405/211 |
| 2015/0321732 | A1 * | 11/2015 | Major | B63B 21/50<br>405/224.1 |
| 2016/0231050 | A1 * | 8/2016 | Faka | F25J 1/0269 |
| 2018/0224204 | A1 * | 8/2018 | Faka | F25J 1/0087 |

FOREIGN PATENT DOCUMENTS

| | | | |
|---|---|---|---|
| AU | 2016259407 | B2 | 10/2018 |
| RU | 2699160 | C1 | 9/2019 |
| WO | 2006052896 | A1 | 5/2006 |
| WO | 2007064209 | A1 | 6/2007 |
| WO | 2010136444 | A1 | 12/2010 |

OTHER PUBLICATIONS

International Search Report and Written Opinion in related application PCT/US2023/010299 dated Apr. 5, 2023.

* cited by examiner

OFFSHORE LNG PROCESSING FACILITY

CROSS-REFERENCE TO RELATED APPLICATIONS

This application is a continuation of U.S. patent application Ser. No. 18/094,322, filed Jan. 6, 2023, which claims benefit of U.S. Provisional application Ser. No. 63/297,496, filed on Jan. 7, 2022. Both application Ser. No. 18/094,322 and application Ser. No. 63/297,496 are incorporated herein by reference in their entireties.

BACKGROUND

Field

Embodiments of the present disclosure generally relate to an offshore facility for liquefying natural gas.

Description of the Related Art

Natural gas is transported across oceans in a liquefied state, referred to as "Liquefied Natural Gas" or "LNG." Typically, natural gas is liquefied by a cryogenic process, then transferred to large ocean-going LNG carrier ships for transportation. The siting of LNG process plant can be inefficient for handling gas that is produced offshore—the gas is first piped to the onshore facility, before being liquefied and transferred to an LNG carrier ship for transportation back offshore. Additionally, it can be difficult to find suitable onshore locations for the LNG process plant that are close to water that is readily accessible by the large LNG carrier ships.

SUMMARY

The present disclosure generally relates to an LNG processing facility for use offshore. In a first embodiment, a process plant includes a plant module disposed on a mobile vessel, the mobile vessel including a hull and a plurality of legs. The mobile vessel includes a first configuration in which the legs are in a raised position relative to the hull, thereby facilitating transport of the mobile vessel and the plant module together on water. The mobile vessel includes also a second configuration in which the legs are in a lowered position relative to the hull, thereby supporting the hull entirely out of the water.

In a second embodiment, a process plant includes a first plant module including a personnel accommodation module on a first vessel, the first vessel comprising a first mobile jack-up vessel including a first hull. The process plant includes a second plant module including a gas treatment facility on a second vessel, the second vessel comprising a second mobile jack-up vessel including a second hull. The process plant includes a third plant module including a gas liquefaction facility on a third vessel, the third vessel comprising a third mobile jack-up vessel including a third hull. The first, second, and third mobile jack-up vessels are configured such that when installed at an offshore location in a body of water, the first, second, and third hulls are entirely above a surface of the body of water; the first mobile jack-up vessel is connected to the second mobile jack-up vessel; and the second mobile jack-up vessel is connected to the third mobile jack-up vessel.

In a third embodiment, a method of installing an LNG process plant at an offshore location in a body of water includes assembling a gas liquefaction facility on a jack-up vessel, transporting the jack-up vessel with the gas liquefaction facility on the water to the offshore location, and deploying legs of the jack-up vessel to a bed of the body of water at the offshore location, thereby raising a hull of the jack-up vessel above a water surface at the offshore location.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure concerns an offshore facility for liquefying natural gas. The offshore facility is installed at a location in a body of water, such as a river, a lake, or a sea. The offshore facility includes a plurality of process plant modules. In some embodiments, each process plant module is disposed on a dedicated supporting structure that is mobile on the body of water, such as by being self-powered, and is operable to stand on the bed underlying the water (such as a river bed, lake bed, or sea bed) in a broad range of water depths while supporting the corresponding module above the water. In some embodiments, it is contemplated that each dedicated supporting structure is configured to be deployed in a water depth of from about 9 m (about 30 ft) to about 190 m (about 625 ft). In some embodiments, it is contemplated that each dedicated supporting structure is configured to be deployed in a water depth greater than 190 m (625 ft).

Figure 1A:
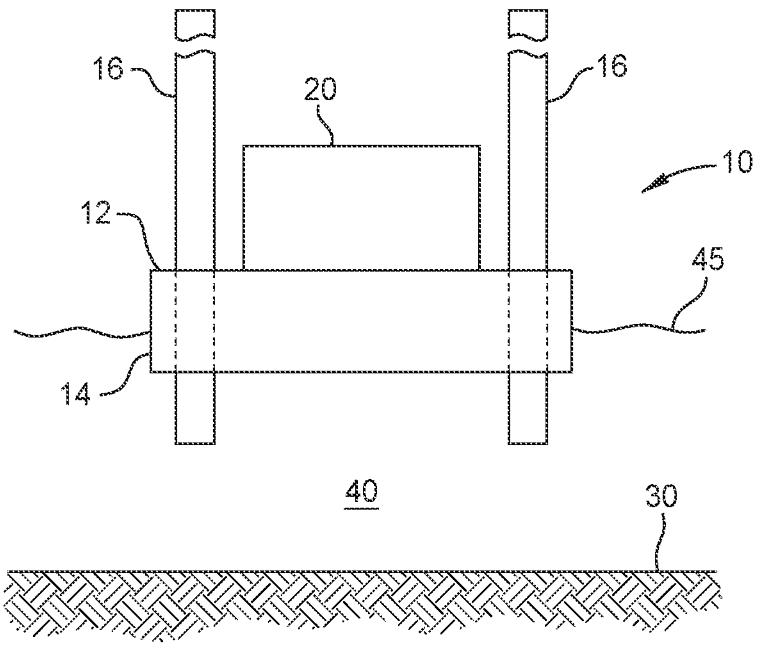
FIGS. 1A and 1B are schematic side views of an embodiment of at least a portion of an offshore facility for liquefying natural gas.
Figure 1B:
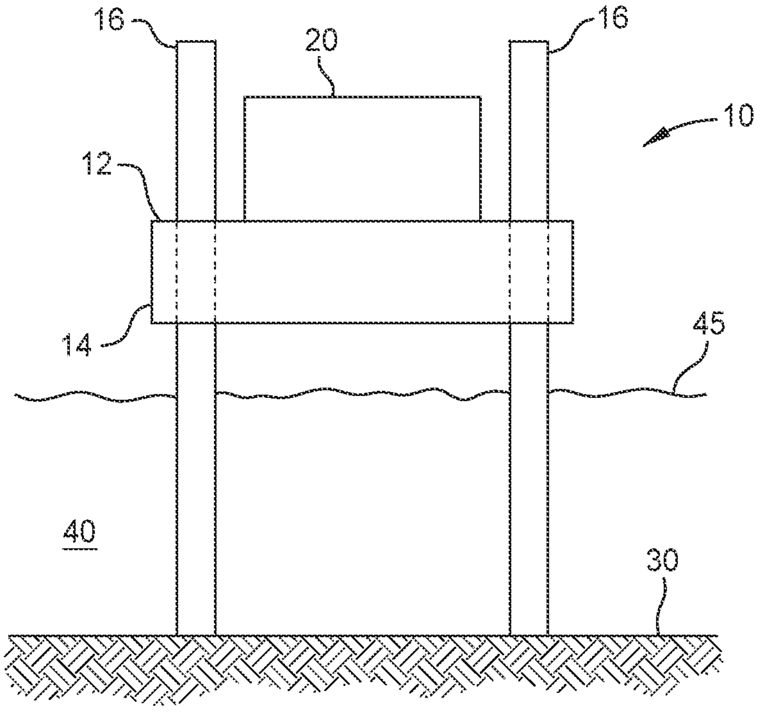

FIGS. 1A and 1B are schematic side views of an embodiment of at least a portion of an offshore facility for liquefying natural gas. FIGS. 1A and 1B illustrate selected components. Other components are omitted for clarity. A process plant module 20 is disposed on one or more decks 12 of a vessel 10 in a body of water 40, such as a river, a lake, or a sea. The vessel 10 includes a hull 14 and legs 16. In FIG. 1A, the legs 16 are in a raised position relative to the hull 14, and therefore are elevated above the bed 30 of the body of water 40, and the vessel 10 is floating with at least a portion of the hull 14 below the surface 45 of the water 40.

The process plant module 20 is transported to an offshore location on the vessel 10. In some embodiments, it is contemplated that the vessel 10 may be self-powered to sail with the process plant module 20. In some embodiments, it is contemplated that one or more additional water craft, such as a tug boat, may be used to convey the vessel 10 with the process plant module 20 to the offshore location. In some embodiments, the vessel 10 may be mounted onto one or more transport vessel, such as a heavy lift vessel, and the transport vessel then may be sailed to the offshore location with the vessel 10 and the process plant module 20.

After arriving at the offshore location, the vessel 10 is oriented such that a reference direction of the vessel 10, such as a "Vessel North," is aligned with a predetermined compass direction. The predetermined compass direction may be any appropriate compass direction, not necessarily a compass north. Once oriented, the hull 14 of the vessel 10 is raised above the surface 45 of the water 40. The raising is achieved by lowering the legs 16 to the bed 30 and then jacking the hull 14 of the vessel 10 upwards to a position above the surface 45 of the water 40. As illustrated in FIG. 1B, the legs 16 are in a lowered position relative to the hull 14, thereby supporting the hull 14. In some embodiments, as illustrated in FIG. 1B, the entire hull 14 is supported by the legs 16 above the surface 45 of the water 40.

In some embodiments, it is contemplated that subsequently, it may be desired to move the process plant module 20 to a different location. For example, it may be desired to operate the process plant module 20 at the different location, or to decommission the process plant module 20, or to refit the process plant module 20 with different components for further use. In such embodiments, the hull 14 of the vessel 10 is lowered into the water 40. When the buoyancy of the hull 14 in the water 40 causes the hull 14 to float, raising the legs 16 with respect to the hull 14 causes the legs 16 to lift off the bed 30, resulting in the configuration shown in FIG. 1A. The vessel 10 with the process plant module 20 is transported to the desired different location, in a fashion as described above.

In some embodiments, it is contemplated that the vessel 10 is a so-called jack-up vessel, such as a jack-up barge or a vessel of a jack-up drilling rig. In some embodiments, it is contemplated that the vessel 10 is a re-purposed jack-up vessel that is refurbished such that at least some pre-existing on-board equipment (such as a drilling derrick and drilling mud handling facilities) are removed in order to facilitate installation of the process plant module 20 onto the vessel 10. In some embodiments, it is contemplated that the vessel 10 may include any one or more of a helipad, a crane, a lifeboat, a workshop, or any other facility known in the art to be included on such jack-up vessels.

In some embodiments, it is contemplated that the process plant module may include a gas liquefaction facility. For example, the gas liquefaction facility may include a cryogenic process facility configured to cool an incoming gas stream to a liquid phase. In some embodiments, it is contemplated that the process plant module 20 may include a gas treatment facility. For example, the gas treatment facility may include a process facility configured to remove contaminants from an incoming gas stream. The contaminants may include, without limitation, any one or more of mercury, other heavy metals, elemental sulphur, sulphur-containing molecules (such as mercaptans), carbon dioxide, and/or water. Additionally, the gas treatment facility may include a process facility configured to remove so-called "heavy" hydrocarbons, such as C5+ hydrocarbons, from the gas. Removal of such heavy hydrocarbons from the gas assists in controlling the freezing point and the heating value of the gas.

In some embodiments, it is contemplated that the process plant module may include a power generation facility, such as one or more gas turbines, configured to generate electricity. In some embodiments, it is contemplated that the process plant module 20 may include a utilities facility. For example, the utilities facility may include a process facility configured to provide one or more utilities such as potable water, nitrogen, instrument air, seawater, hot oil, and diesel. In some embodiments, it is contemplated that the process plant module 20 may include an accommodation facility to house personnel.

In some embodiments, it is contemplated that the process plant module may include at least one each of any two of a gas liquefaction facility, a gas treatment facility, a power generation facility, a utilities facility, and an accommodation facility. In some embodiments, it is contemplated that the process plant module 20 may include at least one each of any three of a gas liquefaction facility, a gas treatment facility, a power generation facility, a utilities facility, and an accommodation facility. In some embodiments, it is contemplated that the process plant module 20 may include at least one each of any four of a gas liquefaction facility, a gas treatment facility, a power generation facility, a utilities facility, and an accommodation facility. In some embodiments, it is contemplated that the process plant module 20 may include at least one each of a gas liquefaction facility, a gas treatment facility, a power generation facility, a utilities facility, and an accommodation facility.

Figure 2:
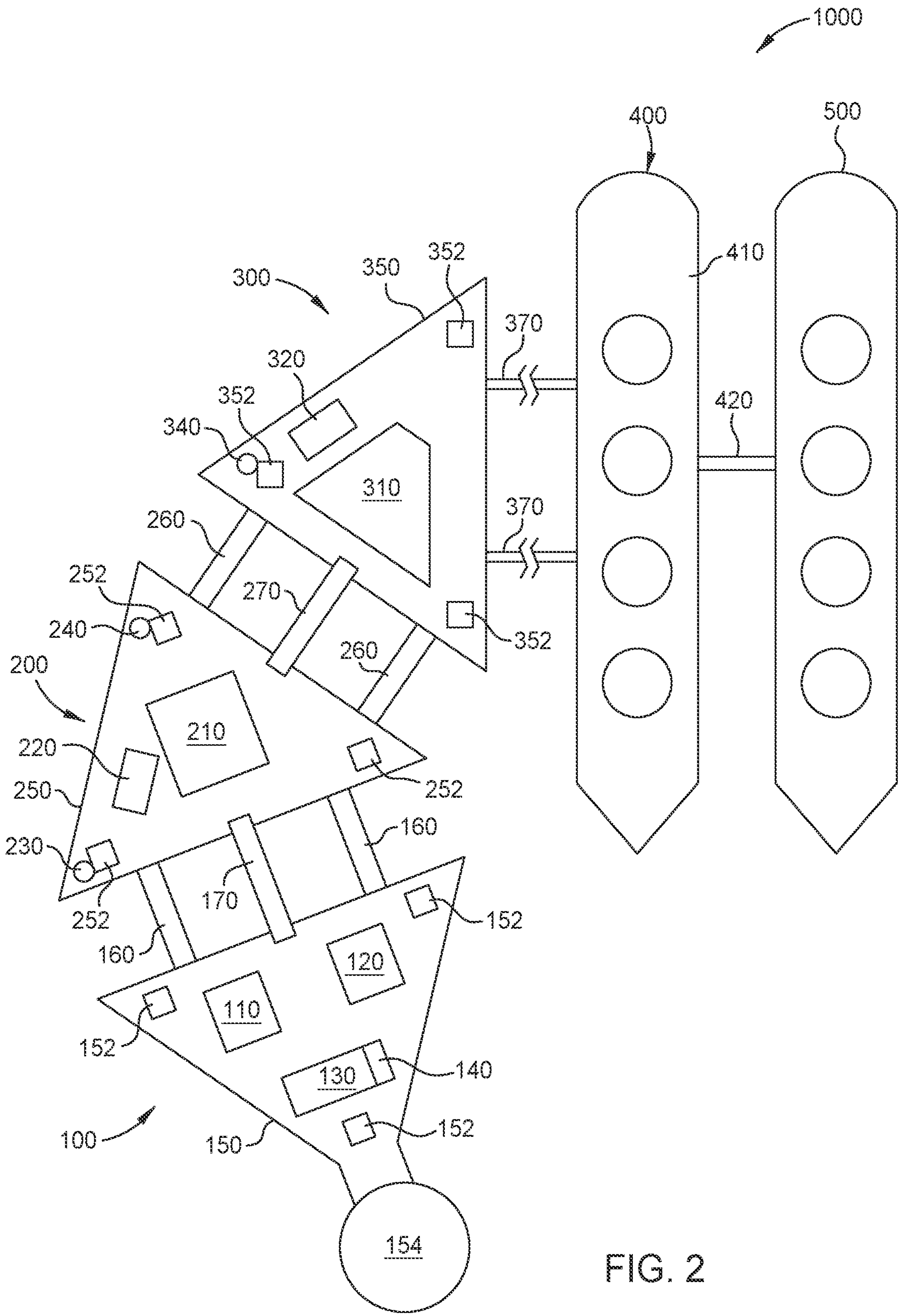
FIG. 2 is an exemplary schematic plan view of a process plant assembled at an offshore location.

FIG. 2 is an exemplary schematic plan view of a process plant 1000 assembled at an offshore location. The offshore location is in a body of water, such as the body of water 40 (FIGS. 1A, 1B), such as a river, a lake, or a sea. Process plant 1000 includes modules 100, 200, 300, 400. FIG. 2 schematically represents selected components of the modules 100, 200, 300, 400. Other components are omitted for clarity.

The first module 100 is installed on a first vessel 150. In some embodiments, it is contemplated that the first vessel 150 may be configured similarly to vessel 10 as a jack-up vessel, including legs 152. The first vessel 150 includes a helipad 154.

The first module 150 includes a utilities facility 110, a power generation facility 120, a crew accommodation facility 130, and a control room 140. In some embodiments, it is contemplated that the utilities facility 110 may provide utilities, such as potable water, nitrogen, instrument air, seawater, hot oil, and diesel for use on any one or more of the first 100, second 200, third 300, and/or fourth 400 process plant modules. In some embodiments, it is contemplated that the power generation facility 120 may include one or more gas turbines, such as per the description above, and may be configured to supply power to any one or more of the first 100, second 200, third 300, and/or fourth 400 process plant modules. In some embodiments, it is contemplated that the accommodation facility 130 may provide living quarters for personnel working at any one or more of the first 100, second 200, third 300, and/or fourth 400 process plant modules. In some embodiments, it is contemplated that the control room 140 may facilitate control of the facilities (such as the utilities facility 110, the power generation facility 120, or any process facility) of any one or more of the first 100, second 200, third 300, and/or fourth 400 process plant modules.

In some embodiments, it is contemplated that a carbon dioxide capture facility may be associated with the power generation facility 120. For example, the carbon dioxide capture facility may receive exhaust gases produced by the power generation facility 120 and process the carbon dioxide contained in the exhaust gases. In some embodiments, it is contemplated that processing the carbon dioxide may include compressing the carbon dioxide for injection into one or more disposal well.

In some embodiments, it is contemplated that the power generation facility 120 plus an associated carbon dioxide capture facility may be located on a different vessel to the first vessel 150 on which the crew accommodation facility 130 is sited.

The second module 200 is installed on a second vessel 250. In some embodiments, it is contemplated that the second vessel 250 may be configured similarly to vessel 10 as a jack-up vessel, including legs 252. The second module 200 includes a gas treatment facility 210, such as described above. In some embodiments, it is contemplated that the second module 200 includes a local power generation facility 220, such as a back-up generator that is activated to generate electricity if a failure or other problem occurs with the power generation facility 120 of the first module 100. In some embodiments, it is contemplated that the local power generation facility 220 includes a diesel-powered generator. In some embodiments, it is contemplated that the local power generation facility 220 includes a gas-powered generator.

The second module includes a riser 230. As shown, the riser 230 is attached to one of the legs 252 of the second vessel 250, however in some embodiments, it is contemplated that the riser 230 may be attached to a different part of the second vessel 250, such as a side, or a moon pool or other opening in the hull of the second vessel 250. Additionally, or alternatively, in some embodiments, it is contemplated that the riser 230 may be attached to a bridge connection that spans a gap between the second vessel 250 and another structure, such as another vessel or facility. The riser 230 routes incoming gas from a delivery pipe (located, for example, at the bed 30, FIGS. 1A, 1B) to the gas treatment facility 210.

In some embodiments, it is contemplated that the gas treatment facility 210 processes the incoming gas into a fuel gas stream for the power generation facility 120 of the first module 100. In embodiments in which the local power generation facility 220 includes a gas-powered generator, it is contemplated that the gas-powered generator receives gas from the fuel gas stream. In some embodiments, it is contemplated that at least of portion of the incoming gas is routed directly to the power generation facility 120 of the first module 100. In embodiments in which the local power generation facility 220 includes a gas-powered generator, it is contemplated that at least of portion of the incoming gas may be routed directly to the local power generation facility 220.

The second module 200 includes a flare 240. As shown, the flare 240 is attached to one of the legs 252 of the second vessel 250, however in some embodiments, it is contemplated that the flare 240 may be attached to a different part of the second vessel 252, such as a dedicated flare boom. The leg 252 to which the flare 240 is shown attached is a different leg 252 to the leg 252 to which the riser 230 is shown attached. However, in some embodiments, it is contemplated that the riser 230 and the flare 240 may be attached to the same leg 252. The flare 240 is connected to the gas treatment facility 210 of the second module 200 in order to provide a safe blowdown of the gas treatment facility 210 when required. The flare 240 is configured to accept warm and wet process streams, such as the effluent from pressure relief valves and blowdown systems associated with the gas treatment facility 210.

The third module 300 is installed on a third vessel 350. In some embodiments, it is contemplated that the third vessel 350 may be configured similarly to vessel 10 as a jack-up vessel, including legs 352. The third module 300 includes a gas liquefaction facility 310, such as described above. In some embodiments, it is contemplated that the third module 300 includes a local power generation facility 320, such as a back-up generator that is activated to generate electricity if a failure or other problem occurs with the power generation facility 120 of the first module 100. In some embodiments, it is contemplated that the local power generation facility 320 includes a diesel-powered generator. In some embodiments, it is contemplated that the local power generation facility 320 includes a gas-powered generator. In embodiments in which the local power generation facility 320 includes a gas-powered generator, it is contemplated that the gas-powered generator receives gas from the fuel gas stream. Additionally, or alternatively, in embodiments in which the local power generation facility 320 includes a gas-powered generator, it is contemplated that at least of portion of the incoming gas may be routed directly to the local power generation facility 320.

The third module 300 includes a flare 340. As shown, the flare 340 is attached to one of the legs 352 of the third vessel 350, however in some embodiments, it is contemplated that the flare 340 may be attached to a different part of the third vessel 350, such as a dedicated flare boom. The flare 340 is connected to the gas liquefaction facility 310 of the third module 300 in order to provide a safe blowdown of the gas liquefaction facility 310 when required. The flare 340 is configured to accept dry process streams at cryogenic temperatures, such as the effluent from pressure relief valves and blowdown systems associated with the gas liquefaction facility 310.

In some embodiments, it is contemplated that the flare 240 of the second module 200 and the flare 340 of the third module 300 are not connected by a process flow path. In such embodiments, a blowdown of the gas treatment facility 210 involves the routing of gas in the second module 200 directly to the flare 240 of the second module 200, but not to the flare 340 of the third module 300. Similarly, a blowdown of the gas liquefaction facility 310 involves the routing of gas in the third module 300 directly to the flare 340 of the third module 300, but not to the flare 240 of the second module 200.

In some embodiments, it is contemplated that the flare 240 of the second module 200 and the flare 340 of the third module 300 are both attached to the same vessel, such as the second vessel 250 or the third vessel 350. In an example, the flare 240 and the flare 340 may be attached to different parts of the same vessel, such as different legs 252 of vessel 250 or different legs 352 of vessel 350. Alternatively, the flare 240 and the flare 340 may be attached to the same part of a vessel, such as the same leg 252 of vessel 250, the same leg 352 of vessel 350, a flare boom of vessel 250, a flare boom of vessel 350, or another portion of vessel 250 or vessel 350.

The fourth module 400 includes an LNG storage facility 410 and facilities 420 for transferring the LNG to an LNG transport vessel 500. As shown, the fourth module 400 is an LNG carrier. In some embodiments, it is contemplated that the fourth module 400 may include on-board power generation and/or crew accommodation. It is contemplated that the fourth module 400 may be located a greater distance from any of the first 100, second 200, or third 300 modules than the separation between any of the neighboring first 100, second 200, or third 300 modules. For example, a nominal separation between the first module 100 and second module 200, or between the second module 200 and third module 300, may be from about 4 m to about 25 m (about 13 ft to about 82 ft), whereas the distance between the third module 300 and the fourth module 400 may be from about 100 m to about 200 m (about 330 ft to about 660 ft).

Installation of process plant 1000 involves transporting the first vessel 150 with the first module 100, the second vessel 250 with the second module 200, and the third vessel 350 with the third module 300 to the offshore location, and erecting the first 150, second 250, and third 350 vessels, as described above with respect to the vessel 10 of FIGS. 1A and 1B. Upon installation, the legs 152, 252, 352 of each of the first 150, second 250, and third 350 vessels, respectively, stand on the bed of the body of water (such as the bed 30, FIGS. 1A, 1B). Additionally, each of the first 150, second 250, and third 350 vessels has a corresponding hull (such as hull 14, FIGS. 1A, 1B) that is raised entirely above the surface of the water (such as the surface 45 of the water 40, FIGS. 1A, 1B).

In some embodiments, it is contemplated that process plant 1000 may include one or more additional modules installed on one or more additional vessels. In an example, a module including a gas pre-treatment facility may be installed on an additional vessel. The additional vessel may be may be configured similarly to vessel 10 as a jack-up vessel. In such an example, the riser 230 may be installed on the additional vessel, and the incoming gas may be processed in the pre-treatment facility before being transferred to the second module 200 on vessel 250.

The first vessel 150 and the second vessel 250 are connected by one or more bridges 160 providing pedestrian access between the first 100 and second 200 modules. The second vessel 250 and the third vessel 350 are connected by one or more bridges 260 providing pedestrian access between the second 200 and third 300 modules. The first 100 and second 200 modules are coupled via interconnectors 170, of which only one is illustrated in FIG. 2 for clarity. Interconnectors 170 route, for example, electrical power, utilities, control system cabling, and fuel gas between the first module 100 and the second module 200. The second 200 and third 300 modules are coupled via one or more interconnectors 270, of which only one is illustrated in FIG. 2 for clarity. Interconnectors 270 route, for example, electrical power, utilities, control system cabling, fuel gas, and treated gas from the gas treatment facility 210 between the second module 200 and the third module 300. The third 300 and fourth 400 modules are coupled via one or more interconnectors 370 that route LNG from the gas liquefaction facility 310 of the third module 300 to the LNG storage facility 410 of the fourth module 400. In some embodiments, it is contemplated that the one or more interconnectors 370 also route any one or more of control system cabling and/or boiloff gas (see below) between the third module 300 and the fourth module 400.

In embodiments in which one or more of the first 150, second 250, or third 350 vessels is a jack-up vessel, it is contemplated that wind and wave action at the offshore location may cause any one of the first 150, second 250, or third 350 vessels to move relative to any neighboring first 150, second 250, or third 350 vessel even after completion of the installation of process plant 1000. For example, such relative movement may include periodic episodes of relative lateral movement, and/or relative vertical movement. Relative lateral movement may include changes of a separation distance between neighboring vessels. Relative lateral movement may include displacement of one vessel with respect to a neighboring vessel in a direction perpendicular to the direction of measurement of the separation distance between the vessels. Relative lateral movement may include displacement of one vessel with respect to a neighboring vessel in a direction at an acute angle to the direction of measurement of the separation distance between the vessels. Relative vertical movement may include the tilting of one vessel with respect to a neighboring vessel.

The interconnectors 170 and 270 between the first vessel 150 and the second vessel 250, and between the second vessel 250 and the third vessel 350, respectively, are configured to withstand such relative lateral and vertical movement. For example, in some embodiments, interconnectors 170 and/or interconnectors 270 include electrical interconnectors for power (and/or electrical/fiber optic interconnectors for control system cables) that are routed along cable ducts with sufficient slack to accommodate relative movement between neighboring vessels. As another example, in some embodiments, interconnectors 170 and/or interconnectors 270 include hoses for certain utilities, such as potable water, seawater, nitrogen, and instrument air, that are draped between neighboring vessels with sufficient slack to accommodate relative movement between the vessels without kinking.

In some embodiments, it is contemplated that interconnectors 170 and/or interconnectors 270 include robust—yet somewhat flexible—fluid transport lines for conveying process fluids and/or other fluids (such as fuel gas, hot oil, and diesel) that pose safety and/or environmental hazards. Examples of such lines may incorporate braided steel reinforcement. Such lines are installed with sufficient slack to accommodate relative movement between neighboring vessels without kinking. In some embodiments, it is contemplated that interconnectors 170 and/or interconnectors 270 include rigid piping with articulated connections for conveying process fluids and/or other fluids (such as fuel gas, hot oil, and diesel) that pose safety and/or environmental hazards. In some embodiments, it is contemplated that interconnectors 170 and/or interconnectors 270 include a combination of robust, yet somewhat flexible lines in addition to rigid piping with articulated connections for conveying process fluids and/or other fluids (such as fuel gas, hot oil, and diesel) that pose safety and/or environmental hazards.

Figure 3:
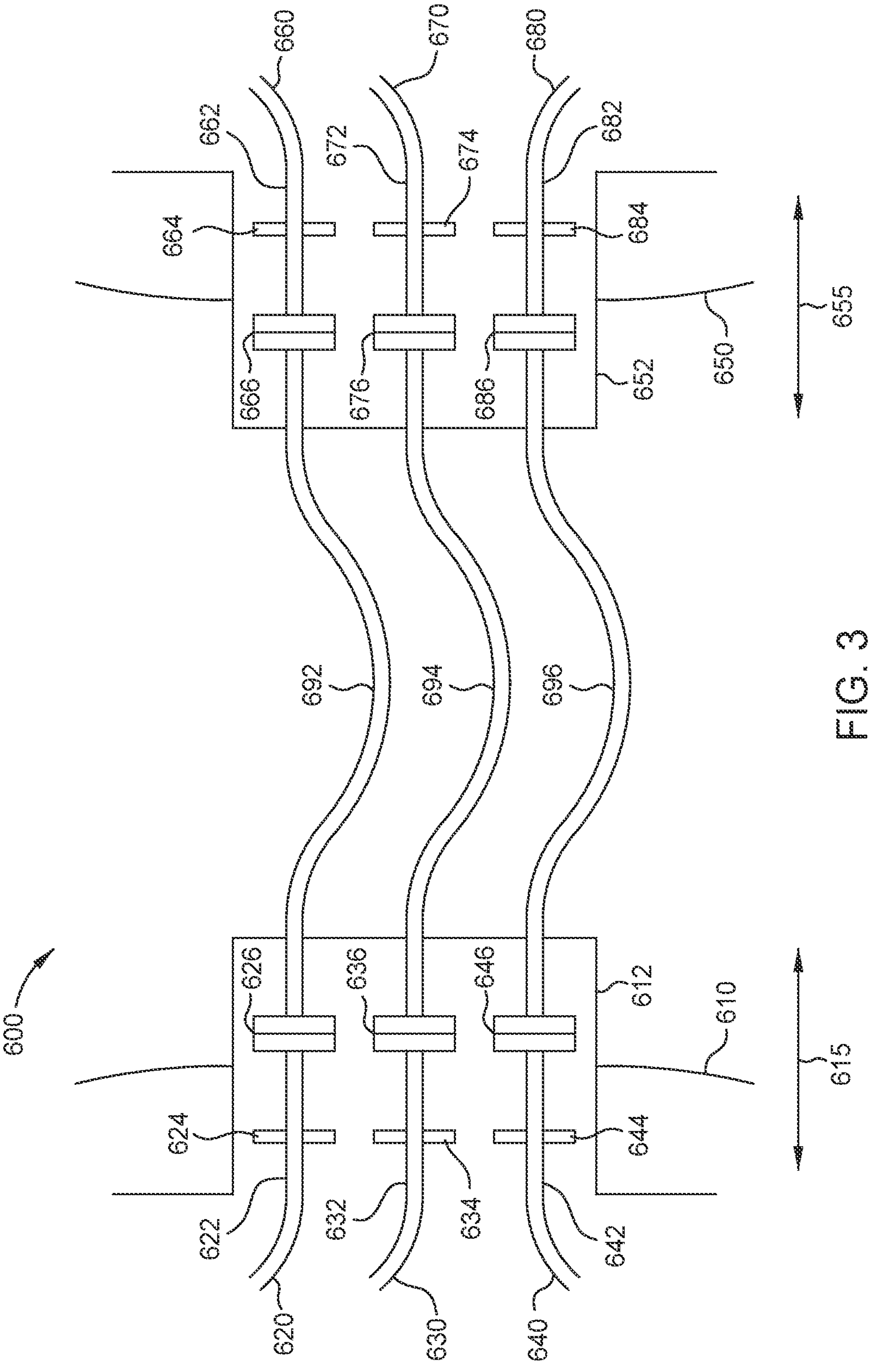
FIG. 3 is an exemplary schematic illustration of an interconnection system that, in some embodiments, is included in the process plant depicted in FIG. 2.

Interconnections between neighboring vessels are facilitated by arranging selected utility/utilities and/or selected process stream(s) onto corresponding balconies on neighboring vessels, such that the balconies face each other. FIG. 3 is an exemplary schematic illustration of such an interconnection system 600.

Vessel 610 represents any one of the first 150, second 250, or third 350 vessels; vessel 650 represents any one of a neighboring first 150, second 250, or third 350 vessel. Connecting portions 622, 632, 642 of lines 620, 630, 640, respectively, are arranged on a balcony 612 disposed on vessel 610. Each line 620, 630, 640 is configured to convey a process fluid, such as treated gas, or a utility, such as diesel. Although only three lines are illustrated, it is contemplated that any suitable number of lines may be present according to the numbers of process fluids and utilities to be conveyed. Each connecting portion 622, 632, 642 is securely anchored, such as by fixing to a suitable support 624, 634, 644, respectively, on the balcony 612. Each connecting portion 622, 632, 642 is a straight section of piping, and terminates at a flange connection 626, 636, 646, respectively. The connecting portions 622, 632, 642 are substantially parallel to an axis 615.

On vessel 650, connecting portions 662, 672, 682 of lines 660, 670, 680, respectively, are arranged on a balcony 652. Line 660 on vessel 650 corresponds to line 620 on vessel 610, line 670 on vessel 650 corresponds to line 630 on vessel 610, and line 680 on vessel 650 corresponds to line 640 on vessel 610. Although only three lines are illustrated, it is contemplated that any suitable number of lines may be present according to the numbers of process fluids and utilities to be conveyed. Each connecting portion 662, 672, 682 is securely anchored, such as by fixing to a suitable support 664, 674, 684, respectively, on the balcony 652. Each connecting portion 662, 672, 682 is a straight section of piping, and terminates at a flange connection 666, 676, 686, respectively. The connecting portions are substantially parallel to an axis 655.

During installation at the offshore location, vessels 610 and 650 are positioned such that axis 615 is substantially parallel to axis 655. For example, an angle between 615 and 655 is 20 degrees or less, such as 15 degrees or less, 10 degrees or less, or 5 degrees or less. Additionally, the balcony 612 of vessel 610 and the balcony 652 of vessel 650 are substantially aligned such that an angle between (for example) a straight line from flange connection 636 to flange connection 676 and axis 615 is 20 degrees or less, such as 15 degrees or less, such as 10 degrees or less, or 5 degrees or less.

Interconnectors 692, 694, 696 represent any one of interconnectors 170 and 270. In some embodiments, it is contemplated that interconnectors 692, 694, 696 may be made from any suitable material that withstands the operating temperature and pressure of the material(s) being conveyed therein, while retaining sufficient flexibility to maintain structural integrity when subjected to relative movement between vessel 610 and vessel 650. For example, interconnectors 692, 694, 696 may be made from a steel, such as carbon steel or stainless steel, or may be in the form of an elastomeric hose. In some embodiments, it is contemplated that interconnectors 692, 694, 696 may incorporate rigid piping with articulated connections. In some embodiments, it is contemplated that interconnectors 692, 694, 696 may incorporate a combination of robust, yet somewhat flexible lines in addition to rigid piping with articulated connections.

In some embodiments, interconnection system 600 may be utilized between types of neighboring structures other than jack-up vessels. In an example, vessel 610 and vessel 650 may be any one of a boat, a semi-submersible vessel, a floating spar, a fixed platform standing on the bed of the body of water (such as the bed 30, FIGS. 1A, 1B), or a structure on land. In such an example, vessel 610 may be the same type of structure as vessel 650, or may be a different type of structure to vessel 650. In another example, one of vessel 610 and vessel 650 is a jack-up vessel, and the other of vessel 610 and vessel 650 is any one of a boat, a semi-submersible vessel, a floating spar, a fixed platform standing on the bed of the body of water, or a structure on land.

Depending upon a number of factors (for example, the gas composition), the temperature of the produced LNG may be from about −175° C. to about −150° C. (about −283° F. to about −238° F.). In some embodiments, it is contemplated that the temperature of the produced LNG may be lower than −175° C. (−283° F.) or higher than −150° C. (−238° F.). Heat leakage at the LNG storage facility 410 of the fourth module 400 may cause some of the LNG to return to the gas phase—so-called "boiloff" gas. Boiloff gas arises also in an end flash drum at the last stage of the liquefaction process in the gas liquefaction facility 310, and when LNG is transferred from the LNG storage facility 410 to the LNG transport vessel 500.

Figure 4:
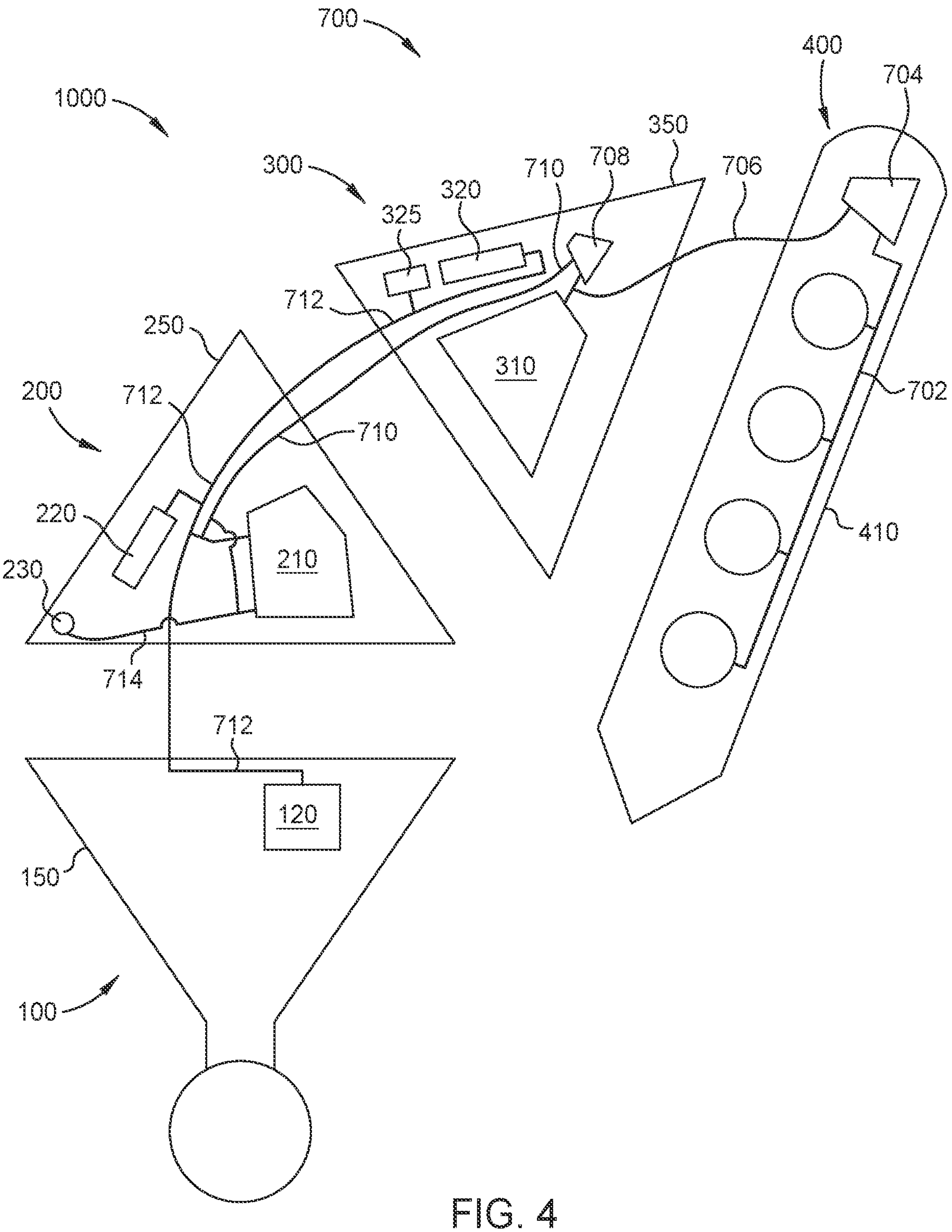
FIG. 4 is an exemplary schematic plan view of a boiloff gas facility that, in some embodiments, is included in the process plant depicted in FIG. 2.

As shown in FIG. 4, in some embodiments, it is contemplated that the process plant 1000 may include a facility for routing boiloff gas from the third 300 and fourth 400 modules to the power generation facility 120 of the first module 100. In other embodiments, boiloff gas from the fourth module 400 is not routed to the power generation facility 120 of the first module 100, but is vented or flared. In some embodiments, it is contemplated that the boiloff gas from the fourth module 400 is combined with the incoming gas supplied via riser 230. In some embodiments, it is contemplated that the boiloff gas from the fourth module 400 is reprocessed in the gas treating facility 210. In some embodiments, it is contemplated that the boiloff gas from the fourth module 400 is reprocessed in the gas liquefaction facility 310.

FIG. 4 is an exemplary schematic plan view of a boiloff gas facility 700 that, in some embodiments, is included in the process plant 1000. Other components of the process plant 1000 have been omitted for clarity. The boiloff gas facility 700 includes boiloff gas feed line 702 that conveys boiloff gas from the LNG storage facility 410 to a low pressure compressor 704 located at the fourth module 400. The low pressure compressor 704 delivers the boiloff gas through a boiloff gas line 706 from the fourth module 400 to the third module 300 at a pressure of about 1.1 bara to about 5 bara (about 16 psia to about 73 psia). At the third module 300, the boiloff gas from the fourth module 400 is combined with boiloff gas generated by the gas liquefaction facility 310 of the third module 300. The combined boiloff gas is compressed by a high pressure compressor 708 to a pressure of about 20 bara to about 70 bara (about 290 psia to about 1,015 psia), such as about 30 bara to about 40 bara (about 435 psia to about 580 psia). The combined boiloff gas is then conveyed via a high pressure boiloff gas line 710 to be fed into a fuel gas line 712. In some embodiments, it is contemplated that the fuel gas line 712 is not part of the boiloff gas facility 700; the primary purpose of the fuel gas line 712 being to supply fuel to one or more fuel gas users of the process plant 1000. Example fuel gas users include any one or more of the power generation facility 120 of the first module 100, the local power generation facility 220 of the second module 200, the local power generation facility 320 of the third module 300, and/or a gas turbine for a refrigerant compressor, such as gas turbine 325. In some embodiments, it is contemplated that gas turbine 325 may be omitted. As illustrated, the combined boiloff gas is fed into the fuel gas line 712 at the second module 200, however, in some embodiments it is contemplated that the combined boiloff gas is fed into the fuel gas line 712 at the third module 300.

As illustrated, in embodiments in which the local power generation facility 320 of the third module 300 includes a gas-powered generator, the fuel gas line 712 feeds the local power generation facility 320 of the third module 300. Hence, the local power generation facility 320 of the third module 300 is powered at least in part by the boiloff gas arising at the fourth module 400. As illustrated, in embodiments in which the local power generation facility 220 of the second module 200 includes a gas-powered generator, the fuel gas line 712 feeds the local power generation facility 220 of the second module 200. Hence, in some embodiments, the local power generation facility 220 of the second module 200 is powered at least in part by the boiloff gas arising at the fourth module 400. The fuel gas line 712 feeds the power generation facility 120 of the first module 100. Hence, in some embodiments, the power generation facility 120 of the first module 100 is powered at least in part by the boiloff gas arising at the fourth module 400.

In some embodiments, it is contemplated that at least a portion of the combined boiloff gas may be fed into a feed gas line 714 from the riser 230 at the second module 200 that conveys incoming gas to the gas treatment facility 210. For example, in some instances there may exist an excess of boiloff gas plus fuel gas compared to the fuel gas demands of power generation facility 120 of the first module 100 plus the local power generation facilities 220, 320 of the second 200 and third 300 modules, respectively. In such instances, at least a portion of the combined boiloff gas may be routed into the feed gas line 714. In some embodiments, it is contemplated that the feed gas line 714 is not part of the boiloff gas facility 700; the primary purpose of the feed gas line 714 being to supply incoming gas from the riser 230 to the gas treatment facility 210. In some embodiments, it is contemplated that at least a portion of incoming feed gas from the riser 230 may be supplied into the fuel gas line 712, either directly or via the feed gas line 714. Such an arrangement facilitates the provision of at least a portion (up to 100%) of the fuel gas needs for all users at the process plant 1000.

The boiloff gas facility 700 provides for effective usage of the boiloff gas arising at the fourth module 400 for power generation without flaring or venting all or a majority of the boiloff gas produced at the fourth module 400 and/or upon transfer of LNG to the LNG transport vessel 500, thereby enhancing the energy efficiency of the process plant 1000.

Figure 5:
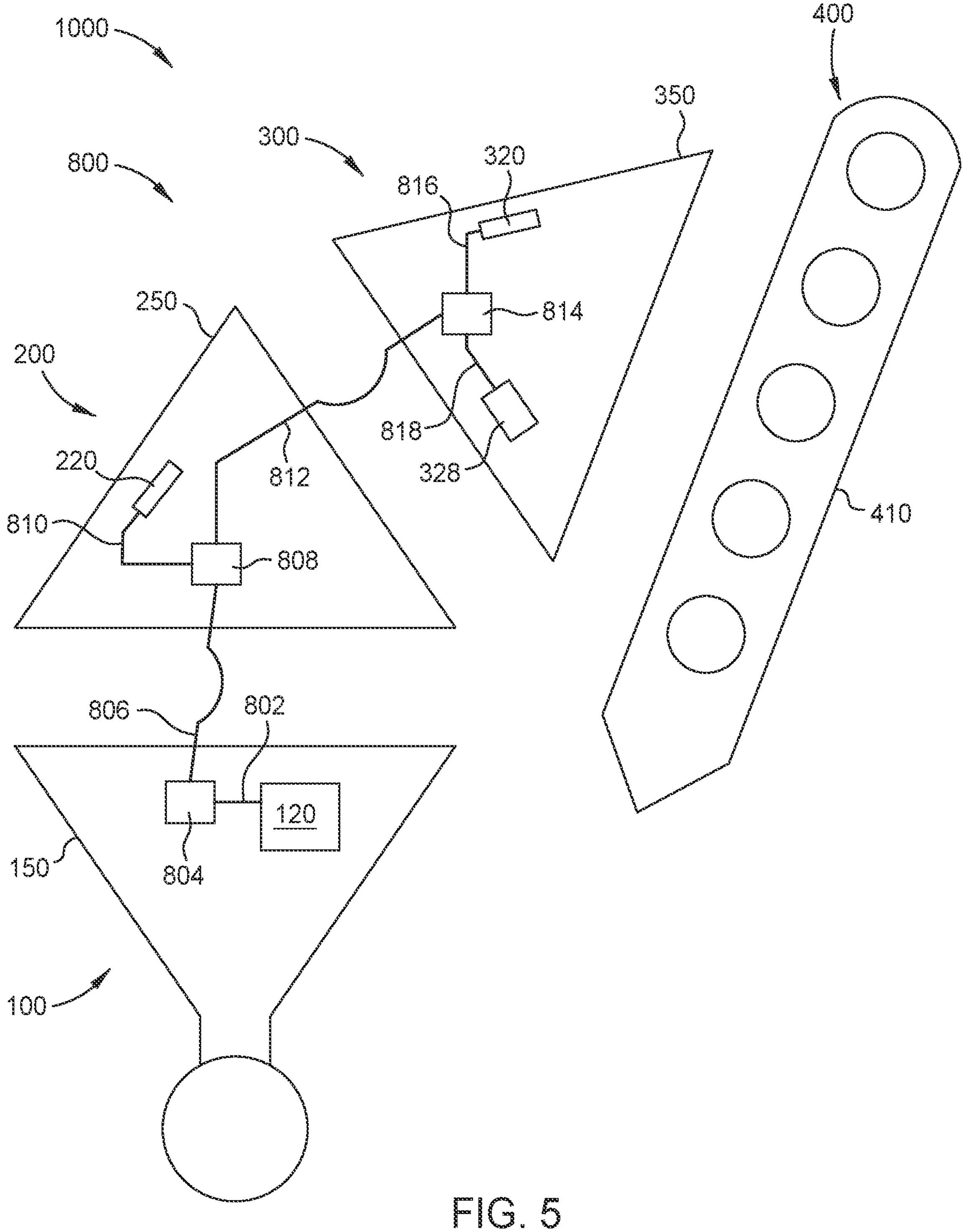
FIG. 5 is an exemplary schematic plan view of an electrical power distribution system that, in some embodiments, is included in the process plant depicted in FIG. 2.

FIG. 5 is an exemplary schematic plan view of an electrical power distribution system that, in some embodiments, is included in the process plant 1000. Other components of the process plant 1000 have been omitted for clarity. The electrical power distribution system 800 provides electricity from the power generation facility 120 of the first module 100 of the process plant 1000 to other facilities of other modules of the process plant 1000 via a series of local distribution stations. Each of module 100, module 200, and module 300 of the process plant 1000 includes at least one local distribution station.

The electrical power distribution system 800 includes one or more power line 802 to route electricity from the power generation facility 120 of the first module 100 to a first local distribution station 804 located at the first module 100. Various other lines (not shown) route electricity from the first local distribution station 804 to other facilities of the first module 100, such as the accommodation module 130, the utilities module 110, and the control room 140.

One or more power line 806 routes electricity from the first local distribution station 804 to a second local distribution station 808 that is located at the second module 200. One or more power line 810 routes electricity to the second local distribution station 808 from the local power generation facility 220 of the second module 200. Various other lines (not shown) route electricity from the second local distribution station 808 to other facilities in the second module 200, such as the gas treatment facility 210.

One or more power line 812 routes electricity from the second local distribution station 808 to a third local distribution station 814 that is located at the third module 300. One or more power line 816 routes electricity to the third local distribution station 814 from the local power generation facility 320 of the third module 300. In some embodiments, it is contemplated that an electric power drive for a refrigerant compressor, such as power drive 328, may receive electric power via one or more power line 818. In some embodiments, it is contemplated that power drive 328 and/or the one or more power line 818 may be omitted. Various other lines (not shown) route electricity from the third local distribution station 814 to other facilities in the third module 300, such as the gas liquefaction facility 310.

In some embodiments, it is contemplated that one or more power line may route electricity from the first local distribution station 804 to the third local distribution station 814 located at the third module 300. In such embodiments, the second local distribution station 808 is bypassed.

Embodiments of the present disclosure provide modular gas liquefaction process plant in which each process plant module is pre-installed on a corresponding vessel, the gas liquefaction process plant including more than one module and more than one corresponding vessel. Each vessel and corresponding process plant module is transported to an offshore location as a combined unit. The offshore location is in a body of water, such as a river, a lake, or a sea. At the offshore location, each vessel is installed in place by deploying legs of the vessel to the bed of the body of water, and raising a hull of the vessel entirely above the surface of the water.

While the vessels 10, 150, 250, 350 are depicted as essentially triangular in shape in a plan view, it is contemplated that any one or more of vessels 10, 150, 250, and/or 350 may take any other geometric shape in a plan view, such as circular, square, rectangular, hexagonal, octagonal, etc.

Although the modules 100, 200, and 300 of process plant 1000 have been schematically illustrated to be disposed in essentially a linear arrangement, it should be understood that other arrangements are contemplated. For example, modules 100, 200, and 300 may be arranged in a triangular formation, thereby facilitating direct access of personnel and utilities between each module and each other module. Nevertheless, the illustrated linear arrangement provides a safety benefit in placing relatively more hazardous portions of the process plant 1000, such as the gas liquefaction facility 310, away from the accommodation facility 130, while maintaining an overall compact footprint.

Additionally, the modularity of the process plant 1000 enables upscaling by the inclusion of additional modules. For example, it is contemplated that an installation may include more than one gas treatment facility 210 and/or more than one gas liquefaction facility 310. Each additional facility may be incorporated in a separate module on a corresponding separate dedicated vessel, arranged and installed according to the present disclosure. Furthermore, because the shapes and/or sizes of vessels may differ from installation to installation, it is contemplated that the various modules, process units, utilities, accommodation facilities, etc. may be arranged on any particular vessel in different configurations from those depicted.

Embodiments of the present disclosure provide a process plant mounted on a supporting structure that is readily adaptable for deployment in a wide range of offshore locations of differing water depths, and may be readily moved to other locations.

Embodiments of the present disclosure provide a modularized process plant in which modules are mounted on discrete supporting structures. The modules and supporting structures can be sized-matched accordingly to provide a compact process plant that is readily scalable by the additional of further modules. Moreover, the modularization of the process plant on discrete supporting structures mitigates safety risks through the placement of the working crew's living quarters away from processing plant containing volatile and explosive substances at extremes of temperature and pressure.

It is contemplated that any one or more elements or features of any one disclosed embodiment may be beneficially incorporated in any one or more other non-mutually exclusive embodiments. While the foregoing is directed to embodiments of the present disclosure, other and further embodiments of the disclosure may be devised without departing from the basic scope thereof, and the scope thereof is determined by the claims that follow.

What is claimed is:

1. A process plant comprising:

a first plant module including a power generation module on a first vessel, the first vessel comprising a first mobile jack-up vessel;

a second plant module including a gas treatment facility on a second vessel, the second vessel comprising a second mobile jack-up vessel; and a third plant module including a gas liquefaction facility on a third vessel, the third vessel comprising a third mobile jack-up vessel;

wherein:

the second vessel is configured to couple to the first vessel such that the second plant module receives electricity from the power generation facility; and the third vessel is configured to couple to the second vessel such that the third plant module receives electricity from the power generation facility.

2. The process plant of claim 1, wherein the first plant module further includes a first local electricity distribution station coupled to the power generation module.

3. The process plant of claim 2, wherein:

the second plant module further includes a second local electricity distribution station coupled to the gas treatment facility; and the second local electricity distribution station is coupled to the first local electricity distribution station such that the gas treatment facility receives electricity from the power generation facility via the first and second local electricity distribution stations.

4. The process plant of claim 3, wherein:

the third plant module further includes a third local electricity distribution station coupled to the gas liquefaction facility; and the third local electricity distribution station is coupled to the second local electricity distribution station, such that the gas liquefaction facility receives electricity from the power generation facility via the first, second, and third local electricity distribution stations.

5. The process plant of claim 1, further comprising a fourth plant module including an LNG storage facility on a fourth vessel.

6. The process plant of claim 5, wherein the fourth plant module further includes a first compressor configured to deliver a first boiloff gas from the LNG storage facility to the third plant module.

7. The process plant of claim 6, wherein:

the third plant module is configured to combine the first boiloff gas with a second boiloff gas from the gas liquefaction facility into a combined boiloff gas stream; and the third plant module further includes a second compressor configured to deliver the combined boiloff gas stream into a fuel gas line.

8. The process plant of claim 7, wherein the third plant module further includes a first local power generator that receives at least a first portion of the first boiloff gas from the fuel gas line.

9. The process plant of claim 8, wherein the second plant module further includes a second local power generator that receives at least a second portion of the first boiloff gas from the fuel gas line.

10. A process plant comprising:

a first plant module including a utilities facility on a first vessel, the first vessel comprising a first mobile jack-up vessel;

a second plant module including a gas treatment facility on a second vessel, the second vessel comprising a second mobile jack-up vessel; and a third plant module including a gas liquefaction facility on a third vessel, the third vessel comprising a third mobile jack-up vessel;

wherein:

the second vessel is configured to couple to the first vessel such that the second plant module receives a utility from the utilities facility; and the third vessel is configured to couple to the second vessel such that the third plant module receives the utility from the utilities facility.

11. The process plant of claim 10, wherein the utility includes at least one of potable water, nitrogen, instrument air, seawater, hot oil, or diesel.

12. The process plant of claim 10, further comprising a fourth plant module including an LNG storage facility on a fourth vessel.

13. The process plant of claim 12, wherein the fourth plant module further includes a first compressor configured to deliver a first boiloff gas from the LNG storage facility to the third plant module.

14. The process plant of claim 13, wherein:

the third plant module is configured to combine the first boiloff gas with a second boiloff gas from the gas liquefaction facility into a combined boiloff gas stream; and the third plant module further includes a second compressor configured to deliver the combined boiloff gas stream into a fuel gas line.

15. The process plant of claim 14, wherein the third plant module further includes a first local power generator that receives at least a first portion of the first boiloff gas from the fuel gas line.

16. The process plant of claim 15, wherein the second plant module further includes a second local power generator that receives at least a second portion of the first boiloff gas from the fuel gas line.

17. A process plant comprising:

a first plant module including a control room on a first vessel, the first vessel comprising a first mobile jack-up vessel;

a second plant module including a gas treatment facility on a second vessel, the second vessel comprising a second mobile jack-up vessel; and a third plant module including a gas liquefaction facility on a third vessel, the third vessel comprising a third mobile jack-up vessel;

wherein:

the second vessel is configured to couple to the first vessel such that the control room facilitates control of the second plant module; and the third vessel is configured to couple to the second vessel such that the control room facilitates control of the third plant module.

18. The process plant of claim 17, wherein the first plant module further includes a personnel accommodation facility.

19. The process plant of claim 17, wherein:

the first plant module further includes a power generation facility;

the second vessel is configured to couple to the first vessel such that the second plant module receives electricity from the power generation facility; and the third vessel is configured to couple to the second vessel such that the third plant module receives electricity from the power generation facility.

20. The process plant of claim 17, wherein:

the first plant module further includes a utilities facility;

the second vessel is configured to couple to the first vessel such that the second plant module receives a utility from the utilities facility; and the third vessel is configured to couple to the second vessel such that the third plant module receives the utility from the utilities facility.

* * * * *